(12) United States Patent
Veit (10) Patent No.: US 8,063,353 B2
(45) Date of Patent: Nov. 22, 2011

(54) CAMERA UNIT FOR MONITORING A SPATIAL REGION, IN PARTICULAR FOR A SAFETY DEVICE ON A PRESS BRAKE

(75) Inventor: Andreas Veit, Filderstadt (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 12/504,716

(22) Filed: Jul. 17, 2009

(65) Prior Publication Data

US 2010/0005982 A1 Jan. 14, 2010

Related U.S. Application Data

(63) Continuation of application No. PCT/EP2007/011314, filed on Dec. 21, 2007.

(30) Foreign Application Priority Data

Jan. 22, 2007 (DE) .......................... 10 2007 004 724

(51) Int. Cl.
*H04N 5/225* (2006.01)
*H04N 7/18* (2006.01)
*F16P 3/00* (2006.01)

(52) U.S. Cl. ...................... 250/208.1; 250/216; 348/374

(58) Field of Classification Search ............... 250/208.1, 250/216; 348/373, 374, 375
See application file for complete search history.

(56) References Cited

U.S. PATENT DOCUMENTS

| | | | |
|---|---|---|---|
| 4,734,778 A | | 3/1988 | Kobayashi |
| 4,961,115 A | * | 10/1990 | Jessop ............................ 348/374 |
| 5,270,534 A | * | 12/1993 | Huiberts et al. .............. 250/216 |
| 6,154,255 A | | 11/2000 | Shishido et al. |
| 7,532,247 B2 | * | 5/2009 | Kamoda et al. ............... 348/373 |
| 2003/0062469 A1 | | 4/2003 | Braune et al. |
| 2010/0005982 A1 | * | 1/2010 | Veit .............................. 100/341 |

FOREIGN PATENT DOCUMENTS

| | | |
|---|---|---|
| DE | 36 22 843 A1 | 2/1987 |
| DE | 44 19 910 A1 | 12/1994 |

(Continued)

OTHER PUBLICATIONS

SICK AG—Industrial Safety Systems; V4000 Press Brake sensor system; Aug. 2005; pp. 17-19.

(Continued)

*Primary Examiner* — John Lee
(74) *Attorney, Agent, or Firm* — Harness, Dickey & Pierce, P.L.C.

(57) ABSTRACT

A camera unit for monitoring a spatial region has an electronic image sensor arranged on a component carrier, and a lens having a lens body. The lens body and the component carrier are connected via a first coupling piece to form an integrated structural unit. The first coupling piece has at least one limited first mobility relative to the lens body and at least one limited second mobility relative to the component carrier within the integrated structural unit. The integrated structural unit has at least one first and one second releasable clamping mechanism in order to fix the first coupling piece, the lens body and the component carrier relative to one another. Such a camera unit can advantageously be used as an imaging sensor for safeguarding a machine operating in an automated fashion.

13 Claims, 3 Drawing Sheets

FOREIGN PATENT DOCUMENTS

| | | |
|---|---|---|
| DE | 197 24 246 B4 | 4/1998 |
| DE | 10 2004 020 998 A1 | 11/2005 |
| EP | 0 597 934 B1 | 5/1994 |
| EP | 1 291 573 | 3/2003 |
| JP | 2006/332894 | 12/2006 |

OTHER PUBLICATIONS

Functional safety and IEC 61508; Sep. 2005; 13 pages.
EN 954-1; Safety-related parts of control systems; Mar. 1997; 34 pages.

* cited by examiner

CAMERA UNIT FOR MONITORING A SPATIAL REGION, IN PARTICULAR FOR A SAFETY DEVICE ON A PRESS BRAKE

CROSS REFERENCES TO RELATED APPLICATIONS

This application is a continuation of international patent application PCT/EP2007/011314, filed on Dec. 21, 2007 designating the U.S., which international patent application has been published in German language as WO 2008/089836 A1 and claims priority from German patent application DE 10 2007 004 724.1 filed on Jan. 22, 2007. The entire contents of these prior applications are incorporated herein by reference.

BACKGROUND OF THE INVENTION

The present invention relates to a camera unit for monitoring a spatial region. More particularly, the invention relates to a camera unit for monitoring a spatial region in front of a moving machine part of a press brake or a similar type of machine having a first machine part moving towards a second machine part.

Moreover, the invention relates to an apparatus for safeguarding such a machine. Such an apparatus is sometimes referred to in the art as a concurrently moving or mobile safety device.

EP 0 597 934 B1 discloses a mechanical construction for an electronic camera that is said to afford a large number of different application options since component carriers for electronic assemblies can be optionally supplemented. The known camera has a lens having a lens body, which can be screwed into a matching threaded hole on a front plate of the camera housing. For its part, the front plate is screwed to a housing body, in which various component carriers are accommodated. The camera has an image sensor, which is plugged onto a holding plate accommodated in the camera housing. The holding plate is connected via plug connections to a component carrier that receives further electronic components. The known camera enables relatively simple assembly by plugging together and screwing together the individual camera components. What is disadvantageous about the known camera system, however, is that the image sensor and the lens cannot be individually oriented or aligned with respect to one another. The orientation of the lens and of the image sensor with respect to one another is fixedly predefined by the dimensions and the manufacturing tolerances of the individual components.

A construction that is mechanically defined in this way may be sufficient or even desirable for many applications. For a camera unit intended to serve as part of a safety-related control unit for safeguarding a machine or installation, however, it is desirable to orient the image sensor and the imaging optical unit including a lens etc. individually with respect to one another in order to be able to evaluate individual pixels or pixel regions of the image sensor in a specific manner, for example. On the other hand, the mechanical construction of a camera unit intended to be used as part of a concurrently moving safety device on a press brake must be very robust and, in particular, withstand severe shocks and vibrations. The alignment of image sensor and lens must not be lost despite severe shocks and vibrations that might occur in some instances. Of course, it is also desirable to assemble the camera unit and align the image sensor simply and rapidly in order to keep down production costs.

SUMMARY OF THE INVENTION

Therefore, it is an object of the present invention to provide a camera unit for monitoring a spatial region which is suitable, in particular, as an imaging sensor for safeguarding dangerous machines or installations.

In particular, it is an object of the invention to provide a camera unit that allows individual orientation of the image sensor relative to the imaging optical unit.

It is another object of the invention to provide a camera unit having a simple and robust mechanical construction in order to withstand severe shocks and vibrations occurring on and in the vicinity of machines like press brakes.

Finally, it is an object of the invention to provide a safety apparatus involving a camera that is robust enough in order to withstand severe shocks and vibrations occurring on and in the vicinity of machines like press brakes, which allows an individual alignment of the imaging sensor relative to the camera optics, and which enables a simply and cost-efficient assembly.

In accordance with one aspect of the invention, there is provided a camera unit for monitoring a spatial region, comprising an electronic image sensor arranged on a component carrier, comprising a lens having a lens body, to which at least one optical element is fixed, and comprising a first coupling piece, via which the lens body and the component carrier are connected to form an integrated structural unit, wherein the first coupling piece, in the integrated structural unit, has at least one limited first mobility relative to the lens body and at least one limited second mobility relative to the component carrier, and wherein the integrated structural unit has at least one first and one second releasable clamping mechanism in order to fix the first coupling piece, the lens body and the component carrier relative to one another.

In accordance with another aspect of the invention, there is provided an apparatus for safeguarding a machine having a first machine part, a second machine part and a spatial region in front of the first machine part, with the first machine part performing an operating movement toward the second machine part, the apparatus comprising a light source, a camera unit, and a control unit, wherein the camera unit is configured to be fixed to the first machine part so as to concurrently move with the first machine part in order to monitor the spatial region during the operating movement, wherein the light source is configured to be arranged opposite from the camera unit so as to illuminate the camera unit during the operating movement, and wherein the control unit is designed to stop the operating movement of the first machine part in response to signals from the camera unit, wherein the camera unit comprises an electronic image sensor arranged on a component carrier, a lens having a lens body, to which at least one optical element is fixed, and a first coupling piece, via which the lens body and the component carrier are connected to form an integrated structural unit, with the first coupling piece, in the integrated structural unit, having at least one limited first mobility relative to the lens body and at least one limited second mobility relative to the component carrier, and with the integrated structural unit having at least one first and one second releasable clamping mechanism in order to fix the first coupling piece, the lens body and the component carrier relative to one another.

The first coupling piece forms a central element of the integrated structural unit since it interacts with the lens body on the one hand, and with the component carrier on which the image sensor is arranged on the other hand. The first coupling piece has two mutually independent mobilities, namely relative to the lens body on the one hand, and relative to the component carrier on the other hand. On account of the at least two releasable clamping mechanisms, these two mobilities can be enabled or blocked independently of one another. This enables the image sensor to be aligned very accurately relative to the lens in different movement directions. It goes without saying that the at least two clamping mechanisms are fixedly clamped after the assembly and alignment, such that the relative mobility of the lens body, first coupling piece and component carrier is reduced to zero. In other words, the at least two releasable clamping mechanisms ensure that the three elements are rigidly coupled and without relative movement with respect to one another after conclusion of the assembly and alignment process. By releasing the first or the second clamping mechanism, however, it is possible to displace the image sensor and the lens body relative to one another along a plurality of movement directions as a result of the limited mobilities, such that the image sensor can be individually oriented relative to the lens. The mobility with the clamping mechanisms released is limited, which means that even with the clamping mechanisms released, the lens body, the first coupling piece and the component carrier are still connected to form an integrated structural unit, which enables simple handling and alignment.

The separation of the mobilities into at least two "partial mobilities" not only simplifies the individual alignment of the image sensor and lens; it also enables a particularly stable and shock-resistant fixing of the components that are moveable with respect to one another. On account of these properties, the novel camera unit is particularly well suited for use as an imaging sensor in a safety device for safeguarding a machine that operates in automated fashion, and in particular for use as an imaging sensor in a concurrently moving safety device on a moving machine part of a press, stamping machine or the like. Therefore, the above object is completely achieved.

In a preferred refinement, the first and the second mobility are orthogonal with respect to one another. It is particularly preferred if one of the mobilities spans or defines one movement plane and the other mobility enables movement perpendicular to said movement plane.

In this refinement, the image sensor and the lens can be oriented very simply and accurately with respect to one another. Moreover, this configuration affords a plurality of degrees of freedom during alignment and, consequently, a high degree of flexibility.

In a further refinement, the image sensor defines a sensor plane, and the first mobility defines a movement plane lying parallel to the sensor plane.

In this refinement, the first mobility enables the lens to be oriented in a plane lying parallel to the surface of the image sensor. The lens can therefore be displaced laterally with respect to the image sensor. It is thus possible to exactly define the area of the image sensor that is illuminated by the imaging optical unit. It is possible, in particular, to optimally position a defined pixel region on the surface of the image sensor into the center of the imaging optical unit, or alternatively to remove it from the area illuminated by the imaging optical unit. In preferred refinements, the lens can also be rotated about an axis perpendicular to the sensor plane. It is thus possible to orient the pixel matrix of the image sensor in such a way that the pixel rows and the pixel columns of the image sensor run parallel to a predefined object contour. This alignment option is in particular advantageous for the use of the novel camera unit as an imaging sensor in a safety device for safeguarding a dangerous machine or installation.

In a further refinement, the first mobility enables a translational and a rotational movement of the first coupling piece relative to the lens body.

In this refinement, the lens body can be displaced and rotated relative to the first coupling piece. The latter is advantageous in order to orient the pixel rows and columns of the image sensor with respect to a defined object contour. Furthermore, this mobility can be used to position a lateral cable outlet on the component carrier in a specific direction. Both adjustment options are in particular advantageous if the image sensor, for its part, can be rotated relative to the coupling piece, which is the case in further preferred refinements of the invention in order to position the image sensor exactly in the focal plane of the lens. A rotational movement between lens body and first coupling piece provides the possibility of compensating for an undesirable rotational position of the image sensor in this case.

In a further refinement, the image sensor defines a sensor plane, and the second mobility defines a movement direction extending perpendicular to the sensor plane.

In this refinement, the second mobility makes it possible to alter the perpendicular distance between the image sensor and the lens body. The image sensor can thus be optimally positioned at the focal point or in the focal plane of the lens. It is advantageous if this mobility is decoupled from the mobility parallel to the sensor plane, since focusing can then be carried out independently of the transverse orientation of the sensor.

In a further configuration, the second mobility enables a combined translational and rotational movement of the first coupling piece relative to the component carrier.

In this refinement, the translational movement and the rotational movement are combined with one another in such a way that they can only be performed jointly and one movement necessitates the other. In other words, a rotational movement leads here to a displacement in the translational direction. This configuration has the advantage that the displacement in the translational direction can be set very sensitively and accurately.

In a further refinement, the camera unit has a second coupling piece, which is fixedly connected to the component carrier and which is moveable relative to the first coupling piece in order to enable the second mobility.

This refinement enables a very robust mechanical construction and stable fixing of the first coupling piece and of the component carrier with the aid of the second clamping mechanism.

In a further refinement, the first and the second coupling piece are screwed to one another, wherein one of the coupling pieces has an external thread and the other coupling piece has an internal thread, which intermesh. Preferably, the first coupling piece has an internal thread and the second coupling piece has an external thread, such that the first coupling piece is screwed to the second coupling piece in the manner of a sleeve nut.

This refinement enables an extremely robust and impact-resistant construction of the novel camera unit. In addition, the relative displacement of the image sensor with respect to the lens can be set very exactly and sensitively by advantageously choosing a shallow thread pitch. This configuration is therefore particularly preferred in order to realize a camera unit for the intended use described in the introduction.

In a further refinement, the second clamping mechanism has a lock nut designed to fix the first and the second coupling piece releasably to one another.

The use of a lock nut enables a very simple and nevertheless robust fixing if the two coupling pieces are connected to one another in the manner described above. Moreover, this realization enables a very compact construction, with the result that the structural size of the novel camera unit can be reduced without making assembly and alignment more difficult.

In a further refinement, the novel camera unit has a spring element designed to engage on one of the coupling pieces in order, with the lock nut released, to fix one coupling piece relative to the other coupling piece. In preferred configurations, the spring element is an elastic ring arranged between the lock nut and the first coupling piece. In this case, it is preferred if said ring concentrically surrounds the second coupling piece.

This refinement enables a particularly compact design having a small construction since that coupling piece on which the spring element engages is held by the spring element in a rest position. Therefore, the other coupling piece can be rotated in the screw connection in order to obtain a displacement of the image sensor relative to the lens body without the spring-loaded coupling piece having to be accessed externally. The spring-loaded coupling piece can be arranged "hidden" within the integrated structural unit. The use of an elastic ring, in particular of an O-ring between lock nut and coupling piece, is a very cost-effective, simple and robust realization.

In a further refinement, the second coupling piece has at least one conical fitting pin that engages into an opening on the component carrier. The second coupling piece is preferably fixed to the component carrier with the aid of three conical fitting pins. Furthermore, it is preferred if the fitting pin engages in a hole on the component carrier whose internal diameter is slightly smaller than the external diameter of the fitting pin in the region of the hole. In this way, a press fit is realized and the component carrier (with the image sensor) is held in an exactly defined position on the second coupling piece.

These refinements enable a simple and cost-effective assembly in conjunction with a high positioning accuracy of the image sensor relative to the lens. Moreover, this configuration produces a very robust and shock-resistant construction.

In a further refinement, the first coupling piece has a projecting flange region, and the first clamping mechanism has at least one first and one second clamp element designed to releasably clamp the projecting flange region. It is particularly preferred if the first coupling piece has a circumferential flange region and the first and the second clamp element are embodied in ring- or disk-shaped fashion in order to fix the circumferential flange region with a large bearing area.

This refinement enables a very robust and impact-resistant realization that can be assembled simply and cost-effectively. Moreover, this refinement enables a first mobility with a plurality of degrees of freedom and hence a high degree of flexibility in the alignment of the image sensor relative to the lens.

In a further refinement, the image sensor is arranged directly on the component carrier without a sensor housing. The image sensor is preferably a semiconductor chip bonded directly onto the component carrier.

This refinement enables a particularly high accuracy in the orientation of the image sensor relative to the lens since mounting tolerances that inevitably arise if a semiconductor chip is accommodated in a typical chip housing, such as a PGA or SPGA housing are eliminated.

In a further refinement, the component carrier, the at least one coupling piece and the lens body house the image sensor in a substantially dust-tight manner.

This refinement is particularly advantageous if the image sensor is bonded without a sensor housing directly onto the component carrier, since the image sensor is protected against contaminants and mechanical damage in this way. This configuration, however, also affords advantages in the case of a commercially available image sensor in which the semiconductor chip is accommodated in a chip housing, since additional protection is made possible in a cost-effective manner.

It goes without saying that the features mentioned above and those yet to be explained below can be used not only in the combination respectively specified but also in other combinations or by themselves, without departing from the scope of the present invention.

BRIEF DESCRIPTION OF THE DRAWINGS

Exemplary embodiments of the invention are explained in the drawing and are explained in more detail in the description below. In the Figures.

DESCRIPTION OF PREFERRED EMBODIMENTS

Figure 1:
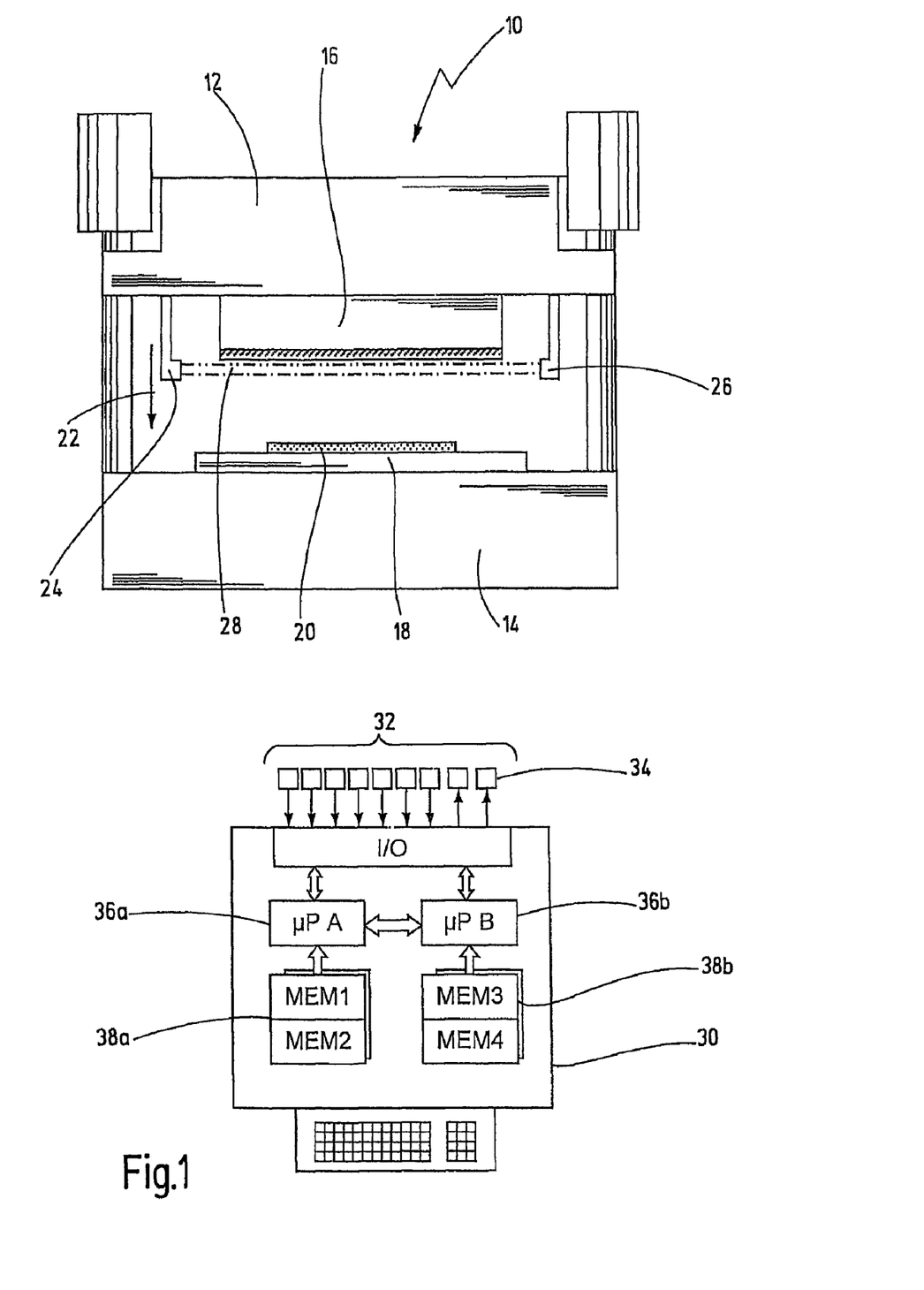
FIG. 1 shows a simplified illustration of a press brake including a safety device which comprises a camera unit according to a preferred exemplary embodiment of the invention.

In FIG. 1, a press brake including a safety apparatus in which a camera unit according to a preferred exemplary embodiment of the invention is used as an imaging sensor is designated in its entirety by reference numeral 10. The press brake has a first machine part 12 and a second machine part 14, which are able to perform an operating movement relative to one another. Typically, the lower machine part 14 is stationary, while the upper machine part 12 is vertically moveable. In principle, however, the lower machine part 14 could also be moveable.

Furthermore, the present invention is not restricted to camera units for safeguarding press brakes. Even though this involves a preferred area of application, the novel camera unit can also be used as an imaging sensor for other applications in which the dangerous operating region of a machine or installation that operates in automated fashion is intended to be safeguarded with the aid of an imaging sensor. Furthermore, the novel camera unit can also be used for other purposes, for example for monitoring a spatial region in the context of access control, or as an imaging sensor in automated installations and processes for quality control.

In the present exemplary embodiment, press brake 10 has a pressing tool 16 (male die) fixed to the upper machine part 12. Arranged on the lower machine part 14 is a female die 18, on which a workpiece 20 lies. The pressing tool 16 can be moved downward in the direction of arrow 22 and descend into the female die 18 in order to deform workpiece 20.

Reference numeral 24 designates a light source. Reference numeral 26 designates a camera unit in accordance with a preferred exemplary embodiment of the invention. The light source 24 and the camera unit 26 are fixed to the upper machine part 12 laterally with respect to the pressing tool 16, such that they follow the operating movement of the upper machine part 12. Light source 24 generates a light beam 26 that runs parallel to the leading edge of the pressing tool 16 and illuminates a camera unit 26 in such a way that an image sensor arranged in the camera unit 26 can receive the light beam 28 provided that it is not interrupted or concealed by an obstacle projecting into the operating region of the pressing tool 16. The light source 24 and the camera unit 26 thus form an optical sensor which monitors that spatial region which is located ahead of the front edge of the pressing tool 16.

Reference numeral 30 designates a control unit having a plurality of terminals 32. The control unit 30 is connected via terminals 32 to sensors and actuators of the press brake 10. In particular, control unit 30 is able to output a stop signal via one or more output terminals 34, by means of which signal the operating movement 22 of the press brake 10 is stopped. Control unit 30 generates said stop signal inter alia when it receives from the camera unit 26 a control signal that signals an intervention in the monitored spatial region.

The control unit 30 can also control the operational sequence of the press brake 10. As an alternative to this, control unit 30 can be a dedicated safety controller that is merely responsible for monitoring the protection functions, and in particular for turning off the operating movement in a timely manner when a hazard situation occurs. In the last-mentioned case, it is advantageous if the control unit 30 is wholly or partly integrated in the camera unit 26. As illustrated in FIG. 1, however, control unit 30 can also be arranged separately from the camera unit 26.

Control unit 30 has a first and a second processor 36a, 36b and also a first and a second memory 38a, 38b in the present case. Processors 36a, 36b and memories 38a, 38b symbolize redundant signal processing channels within control unit 30, which is a known realization for safety controllers for controlling the safety functions. This multichannel-redundant construction is advantageously maintained if the control unit 30 is wholly or partly integrated in the camera unit 26. In preferred exemplary embodiments, camera unit 26 is realized in a failsafe manner insofar as it satisfies at least the requirements according to category 3 of European Standard EN 954-1 or similar safety requirements, such as according to IEC 61508 for instance.

A preferred mechanical construction for camera unit 26 is described below with reference to FIGS. 2 and 3. Identical reference symbols designate identical elements in each case.

Camera unit 26 has a lens 44 having a lens body 46, where one lens element 48 is arranged here. In principle, lens 44 can also have a plurality of lens elements (not illustrated). Furthermore, lens 44 can also contain other optical elements, such as mirrors or lens-mirror combinations for instance. The optical axis of lens 44 is indicated by reference numeral 50 in FIG. 3.

Reference numerals 52 and 54 designate two mounting flanges, wherein mounting flange 52 is seated at the front (distal) end 56 of the lens body while mounting flange 54 is arranged at the rear (proximal) end 58 of the lens body. The two mounting flanges 52, 54 respectively have a planar mounting area 52a and 54a, at which the camera unit 26 can be fixed in a camera housing (not illustrated here) and/or to a holder.

Lens body 46 is embodied in conical fashion here. Its clear internal diameter tapers from the distal end 56 toward the proximal end 58. An image exit opening 60 is arranged at proximal end 58.

Furthermore, a circular mounting flange 62 is arranged at the proximal end 58, said mounting flange being fixedly connected to the lens body 46. The mounting flange 62 has a plurality of holes 63 that are used to connect the lens body 46 to an image sensor 64 to form an integrated "one-piece" camera unit in the manner described below.

The image sensor 64 is arranged on a component carrier 66. Preferably, further electronic components (not illustrated here) serving for driving and reading the image sensor 64 are situated on the component carrier 66, too. Furthermore, the processors 36a, 36b and memories 38a, 38b of the controller 30 could be wholly or partly arranged on component carrier 66. As an alternative, said components could be arranged on a further component carrier (not illustrated here) connected to component carrier 66 via plug connections.

In the preferred exemplary embodiment, image sensor 64 is bonded directly onto the component carrier 66 without a sensor or chip housing. Component carrier 66 has three holes 68 arranged in such a way that they span a triangular area within which image sensor 64 is arranged. The holes 68 serve to connect the component carrier 66 to the elements described below.

Reference numeral 70 designates a first coupling piece, which is embodied in ring-shaped fashion and has a ring-shaped circumferential, radially projecting flange region 71. Reference numeral 72 designates a second coupling piece in the form of a ring-shaped sleeve. The first coupling piece 70 has an internal thread 74. The second coupling piece 72 has an external thread 76. The internal thread 74 and the external thread 76 are embodied in such a way that the coupling piece 70 can be screwed onto the second coupling piece 72 in the manner of a sleeve nut (see FIG. 3). In principle, an opposite arrangement would also be possible, in which the second coupling piece 72 is screwed onto the first coupling piece 70 in the manner of a sleeve nut.

Figure 3:
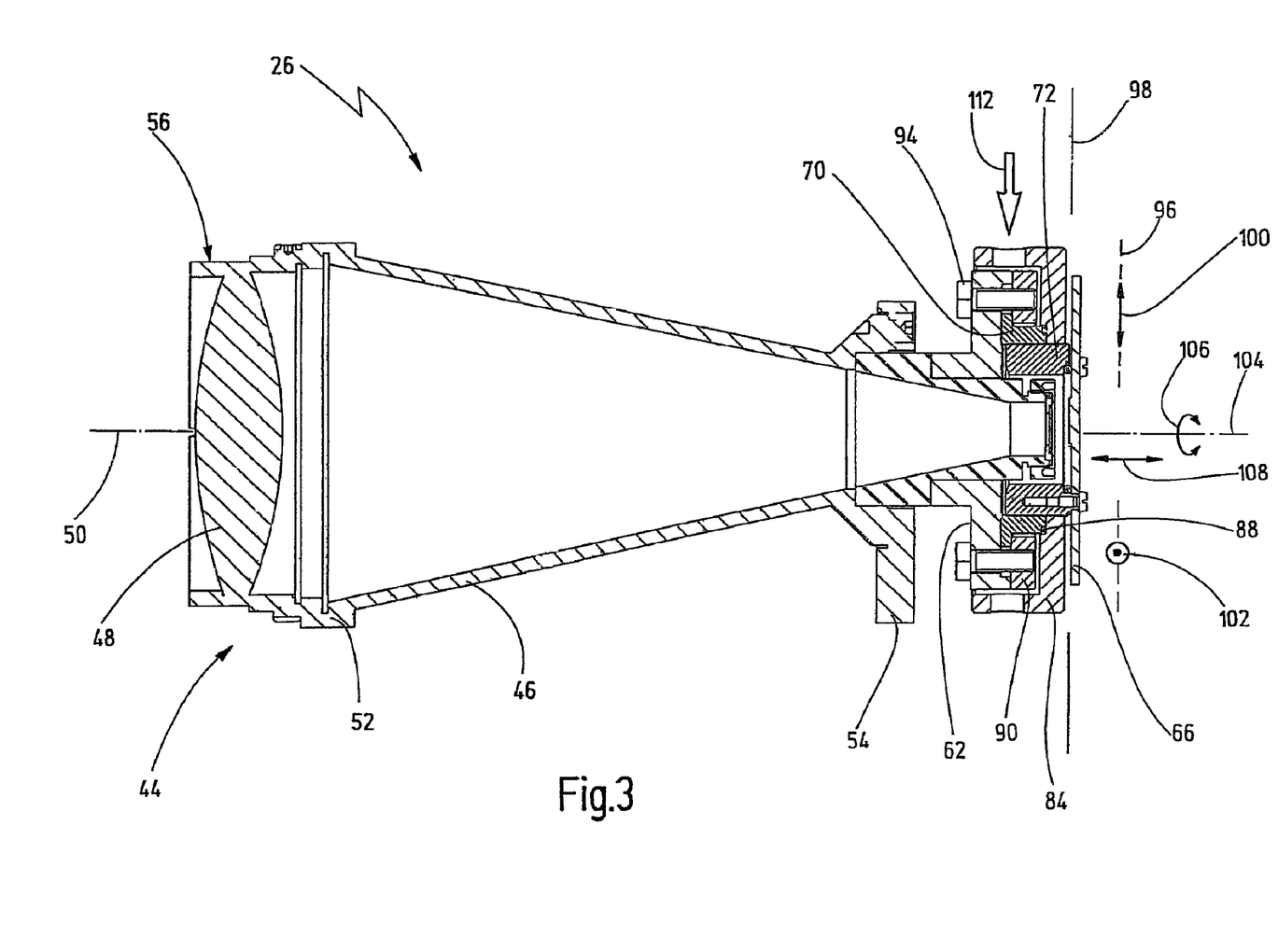
FIG. 3 shows the exemplary embodiment of FIG. 2 in a lateral cross section.

Second coupling piece 72 has, on its end face that faces component carrier 66, three conical fitting pins 78 that are designed to engage into the holes 68 on the component carrier 66 (see FIG. 3). In the exemplary embodiment illustrated, the fitting pins are integrally formed on the second coupling piece 72. Each fitting pin 78 has an axial threaded hole into which one of the screws 80 can be screwed. As is illustrated in FIG. 3, the second coupling piece 72 is fixedly connected to the component carrier 66 with the aid of the fitting pins 78. The conical fitting pins are dimensioned here in such a way that they have a small oversize in comparison with the clear internal diameter of the holes 68 at the level of the holes 68. In this way, a press fit is realized which ensures that the second coupling piece 72 is oriented very exactly and very stably with respect to the component carrier 66. On account of the precise screw connection between the first and second coupling pieces, the first coupling piece 70 is then also oriented with high accuracy with respect to the component carrier 66 and the image sensor 64 situated thereon.

Reference numeral 82 designates an O-ring arranged between the second coupling piece 72 and the component carrier 66. O-ring 82 provides for a dust-tight connection between the second coupling piece 72 and the component carrier 66.

Reference numeral 84 designates a lock nut that is screwed onto the external thread 76 of the second coupling piece 72 between the first coupling piece 70 and the component carrier 66. A second O-ring 88 is additionally situated between the first coupling piece 70 and the lock nut 84. O-ring 88 functions as a spring element which, with the lock nut 84 released, presses the first coupling piece 70 in the direction of the mounting flange 62. Consequently, with the lock nut slightly released, the second coupling piece 72 can be rotated relative to the first coupling piece 70 even though the first coupling piece 70 is hidden in the integrated component carrier and, thus, is not accessible externally.

Reference numeral 90 designates a clamping ring arranged concentrically with respect to the first coupling piece 70. On its end faces, clamping ring 90 has a plurality of holes 92 aligned with the holes 63 on the mounting flange 62. The clamping ring 90 is releasably screwed to the mounting flange 62 with the aid of screws 94 that engage into said holes 92, wherein the circumferential flange region 71 of the first coupling piece 70 is fixedly clamped between the mutually opposite end faces of the mounting flange 62 and of the clamping ring 90. Mounting flange 62, clamping ring 90 and screws 94 thus form a first clamping mechanism, with the aid of which the first coupling piece 70 can be fixed relative to the lens body 46.

The dimensions of the first coupling piece 70 and of the clamping ring 90 are chosen, however, in such a way that with the screws 94 released, the first coupling piece 70 has a limited mobility within the integrated structural unit. In particular, with the screws 94 released, the first coupling piece 70 can be displaced along a movement plane 96 lying parallel to a sensor plane 98 spanned or defined by the surface of the image sensor 64. Thus, with the screws 94 released, it is possible to displace the first coupling piece 70 in the vertical direction 100 and in the horizontal direction 102. Moreover, with the screws 94 released, the first coupling piece 70 can be rotated about an axis 104 that coincides with the optical axis 50 of the lens 54 in the preferred exemplary embodiment. This rotational movement is illustrated by the double-headed arrow 106 in FIG. 3. It is substantially independent of the translational movements 100, 102.

Since, with the lock nut 84 tightened, the first coupling piece 70 is connected rigidly to the second coupling piece 72 and consequently to the component carrier 66, this arrangement enables a displacement of the image sensor 64 relative to the lens body 46 along the three movement directions 100, 102, 106. In addition, with the screws 94 released, there is a limited play in the axial direction, that is to say perpendicular to the movement plane 96. This play is eliminated, however, as soon as the screws 94 are retightened.

On the other hand, the component carrier 66 with the image sensor 64 can be displaced in a movement direction 108 perpendicular to the sensor plane 98 by the lock nut 84 being released and the second coupling piece 72 subsequently being rotated about the axis 104. On account of the threaded toothing between the first and second coupling pieces, this rotational movement leads to a translational movement in the direction of the double-headed arrow 108. Renewed locking with the aid of the lock nut 84 fixes the two coupling pieces 70, 72 relative to one another again, such that the perpendicular distance then set between image sensor 64 and image exit opening 60 is maintained.

Figure 2:
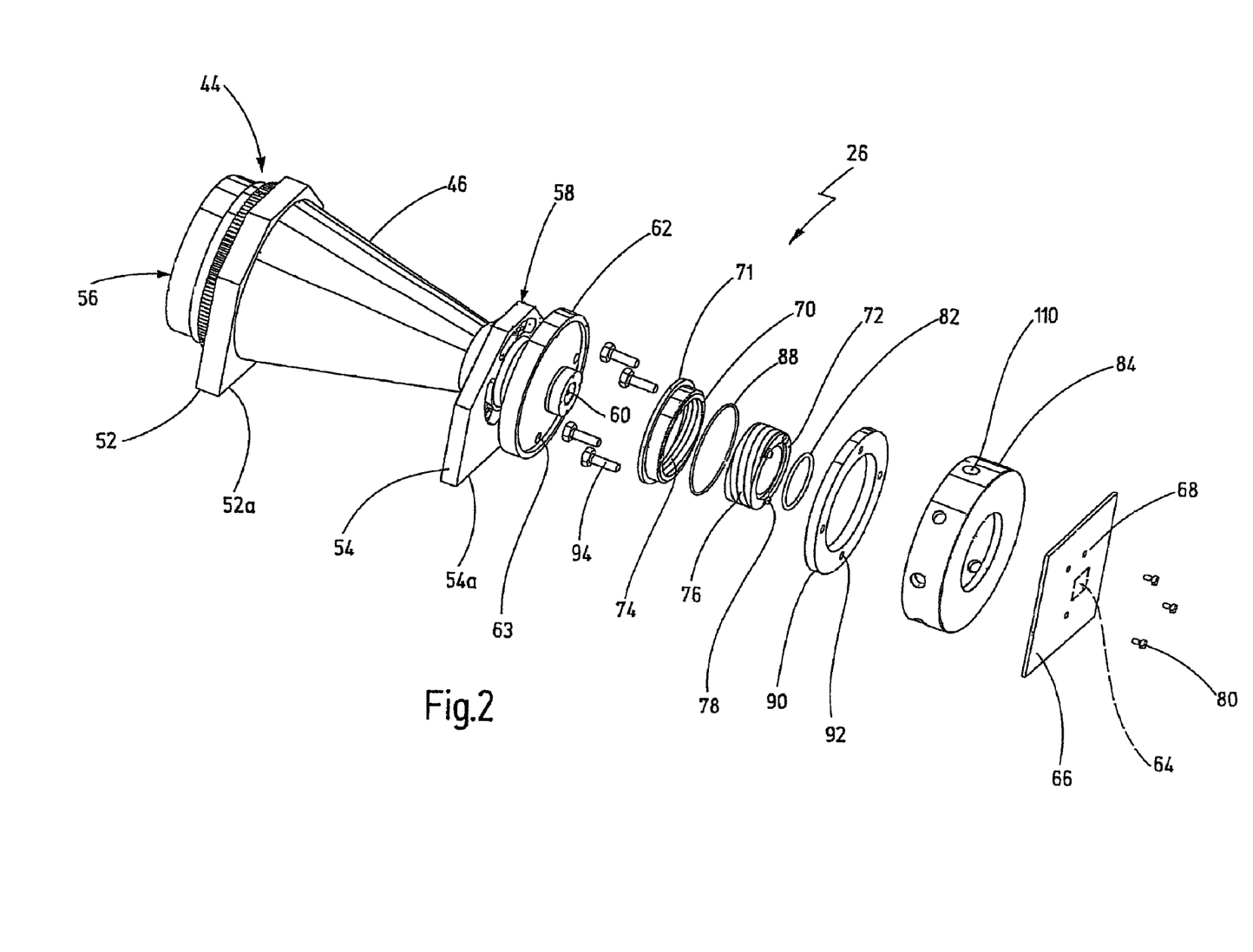
FIG. 2 shows an exploded illustration of a preferred exemplary embodiment of the novel camera unit.

In the exemplary embodiment illustrated, the lock nut 84 is embodied in pot-shaped fashion, that is to say that it has a U-shaped cross-sectional profile (see FIG. 3) with a lateral surface in which radial holes 110 are arranged (FIG. 2). The radial holes 110 make it possible to powerfully tighten and release the lock nut 84 with the aid of a correspondingly adapted hook wrench (not illustrated). Furthermore, holes 110 can advantageously be used to enable a finely proportioned displacement of the connected elements "first coupling piece 70, second coupling piece 72, component carrier 66 and image sensor 64" within the movement plane 96 if the screws 94 have been released and the first coupling piece 70 correspondingly has a first mobility within the integrated structural unit. For this purpose, spring pins and/or adjusting screws can be introduced into the radial holes 110, which is illustrated by arrow 112 in FIG. 3.

In the preferred exemplary embodiment, the component carrier 66, the second coupling piece 72 (together with O-ring 82), the first coupling piece 70 and the mounting flange 62 form a substantially dust-tight housing for the "bare" image sensor 64. By virtue of the labyrinthine toothing on account of the flanges engaging over one another, the dust-tight housing is also maintained when the screws 94 are released in order to move the first coupling piece 70 relative to the lens body 46.

Overall, the camera unit 26 enables an individual setting of the perpendicular distance between image sensor 64 and image exit opening 60 and a centering of the image sensor 64 relative to the lens 46. The setting of the perpendicular distance makes it possible to position the image sensor 64 exactly at the focal point or in the focal plane of the lens 44. Moreover, the imaging scale can be varied by the setting of said distance. Centering of the image sensor within the movement plane 96 makes it possible to set the illuminated pixel area on the image sensor 66. Moreover, the pixel rows and pixel columns can be oriented by a rotational movement 106 parallel to any desired object contour, even if the image sensor 64 was adjusted by a rotational movement about the axis 104. The rotational movement 106 additionally makes it possible to position a cable outlet (not illustrated here) at the component carrier 66 at a desired location and in a desired direction.

Despite these diverse possibilities for adjustment, the integrated structural unit comprising lens body 46, coupling pieces 70, 72 and component carrier 66 is very robust and impact-resistant, such that the camera unit 26 can readily be used as an imaging sensor for a concurrently moving safety device on the press brake 10. Furthermore, camera unit 26 is very compact and the individual alignment elements and clamping mechanisms are readily accessible.

There are, of course, numerous possibilities for variation. By way of example, screws 94 could be screwed in an opposite direction to that illustrated in FIG. 3 if the lock nut 84 is made smaller, and/or with sufficient perpendicular distance with respect to the clamping ring 90. Instead of O-ring 88, some other spring element could be used, in principle, in order to bring one of the coupling pieces 70, 72 into a frictional locking which is sufficient, with the lock nut 94 released, to enable a screwing movement between the first and second coupling pieces.

What is claimed is:

1. A camera unit for monitoring a spatial region, comprising:
    an electronic image sensor defining a sensor plane and arranged on a component carrier;
    a lens defining an optical axis and having a lens body to which at least one optical element is fixed; and
    a coupling assembly via which the lens body and the component carrier are connected to form an integrated structural unit;
    wherein the coupling assembly includes a first coupling piece that is releasably secured to the lens body and has a first mobility enabling limited movement of the first coupling piece relative to the lens body in a plane parallel to the sensor plane, and a second coupling piece fixedly connected to the component carrier and moveably coupled to the first coupling piece to define a second mobility enabling limited movement of the second coupling piece relative to the first coupling piece parallel to said optical axis.

2. The camera unit of claim 1, wherein the first and the second mobility are orthogonal with respect to one another.

3. The camera unit of claim 1, wherein the first mobility enables a translational and a rotational movement of the first coupling piece relative to the lens body.

4. The camera unit of claim 1, wherein the second mobility enables a combined translational and rotational movement of the first coupling piece relative to the component carrier.

5. The camera unit of claim 1 wherein one of the coupling pieces has an external thread and the other coupling piece has an internal thread, and wherein the first and the second coupling pieces are threaded to one another with the external and the internal threads intermeshing.

6. The camera unit of claim 1, wherein the second coupling piece has at least one conical fitting pin that engages into an opening on the component carrier.

7. The camera unit of claim 1, wherein the image sensor is a bare image sensor arranged directly on the component carrier.

8. The camera unit of claim 1, wherein the component carrier, the coupling assembly and the lens body house the image sensor in a substantially dust-tight manner.

9. The camera unit of claim 1, further comprising:
a first releasable clamping mechanism for releasably fixing the first coupling piece to the lens body and a second releasable clamping mechanism for releasably fixing the second coupling piece to the first coupling piece.

10. The camera unit of claim 9, wherein the first coupling piece has a projecting flange region, and the first clamping mechanism has at least one first and one second clamp element designed to releasably clamp the projecting flange region.

11. The camera unit of claim 9, wherein one of the coupling pieces has an external thread and the other coupling piece has an internal thread, and wherein the first and the second coupling pieces are threaded to one another with the external and the internal threads intermeshing.

12. The camera unit of claim 11, wherein the second clamping mechanism comprises a lock nut designed to fix the first and the second coupling pieces releasably to one another.

13. The camera unit of claim 12, further comprising a spring element designed to engage on one of the coupling pieces in order, with the lock nut released, to fix the one coupling piece relative to the other coupling piece.

* * * * *